United States Patent [19]

Aanestad

[11] Patent Number: 4,498,425
[45] Date of Patent: Feb. 12, 1985

[54] ANIMAL RESTRAINER

[76] Inventor: Robert D. Aanestad, Rte. 1, Box 189, Isle, Minn. 56342

[21] Appl. No.: 569,200

[22] Filed: Jan. 9, 1984

[51] Int. Cl.³ .............................................. A01K 15/04
[52] U.S. Cl. ...................................... 119/96; 119/98; 119/151
[58] Field of Search ............................ 119/96, 98, 151

[56] References Cited

U.S. PATENT DOCUMENTS

| 1,085,954 | 2/1914 | Townsend | 119/98 |
| 1,359,905 | 11/1920 | Molyneux | 119/96 |
| 1,531,052 | 3/1925 | Tuff | 119/98 X |
| 3,967,343 | 7/1976 | Westervett et al. | 119/96 X |

Primary Examiner—Hugh R. Chamblee

[57] ABSTRACT

A portable animal restrainer comprising a cage closed at its rear, slides and top, and open at the bottom and front for placing over, and entrapping, the animal and having a hinged nose harness mounted on a forwardly projecting frame attached to the front of the cage for holding the animal's head in a slightly raised and locked position at the nose and mouth thus restraining the animal from motion.

6 Claims, 4 Drawing Figures

ANIMAL RESTRAINER

BACKGROUND OF THE INVENTION

This invention relates to a portable apparatus for the two-step action of catching and restraining animals, and more particularly for restraining calves between one and five days old in the weight range from about 55 to 110 pounds.

Calves require much attention in their first few days of life. The environment in which they are raised and their lack of natural immunities at birth require immediate and necessary attention, such as: naval observation to ensure proper healing and possible treatment; body temperature may need to be measured for signs of illness; applying implants; injecting antibiotics; immunizing; administering bolus treatments and treating other localized general problems. In addition, calves at this age are commonly castrated, their ears are tagged or tatooed, they are branded, and their birth weight is measured.

None of these jobs can easily be done by one cattleman after he initially catches the calf to be worked on. The calf must be restrained for treatment while the cattleman must be concerned for his own safety in avoiding knife nicks and calf kicks. The job may be further complicated under the slippery conditions of manure or mud.

In the past the cattleman required assistance of another to catch, restrain and treat a calf. U.S. Pat. No. 4,312,299, issued to Leiker on Jan. 26, 1982, is a four-step action calf chute, with the approximate dimensions of 42 inches high, 40 inches long and 23 inches deep. This patent discloses a chute which allows one cattleman to push the calf forward into the V-shaped chute from the rear and to close a side gate in a scissors action, thus squeezing the body of the calf and clamping the head of the calf on one side against the frame. There is a chain latch on the rear of the chute to latch the side gate and lock the calf in place. The Leiker patent is a stationary chute designed to handle older calves up to 250 pounds. It is a four-step action chute in that it requires catching the calf, pushing it into the head gate, closing the side gate and latching the gate at the rear. There is no access to the lower extremity of the calf while in the chute nor any mechanism to prevent the calf from bawling for its mother. Access for branding requires removal of two bars on either side of the chute.

The present invention presents a novel apparatus for catching and restraining a calf between one and five days old, typically weighing between 55 and 110 pounds.

It is primary object of the present invention to provide a lightweight, sturdy, portable calf restrainer to be operable by one cattleman in the two-step action of placing it over a calf, and fitting the hinged nose harness over the nose and mouth area of the head.

It is another object of this invention to restrain the calf and yet provide easy access to the calf for castrating, tatooing or tagging either ear, applying implants, injecting antibiotics or immunizations, administering bolus treatments, measuring body temperatures, treating the naval, branding, measuring birth weight and the like.

It is further an object of this invention to provide a harness for the calf's nose and mouth to prevent bawling and restrict head movement.

SUMMARY OF THE INVENTION

The Invention comprises a lightweight U-shaped frame adapted for lifting over the body of a calf and restraining it from motion in a rearward or side direction. The invention includes a forwardly projecting frame having a hinged nose harness attached thereto for receiving and restraining the head of the animal in fixed position.

DESCRIPTION OF THE PREFERRED EMBODIMENT

Figure 1:
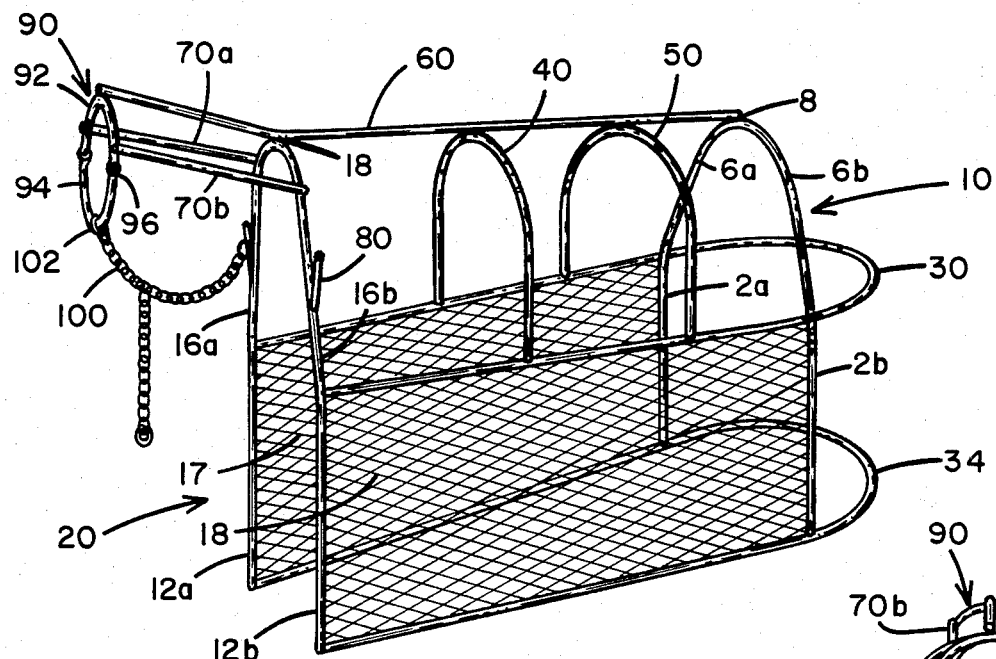
FIG. 1 is an isometric view of the invention.

Referring first to FIG. 1, the frame of the calf restrainer is made of a tubular or metal rod construction for sturdy, yet lightweight use. Metals such as steel, magnesium or alloy may be used. The invention may take other forms, but the preferred embodiment is made from ⅜-inch metal rod to provide light weight and enhance portability of the invention. The overall dimensions are about 22 inches high, 36 inches long and 12 inches deep.

Figure 2:
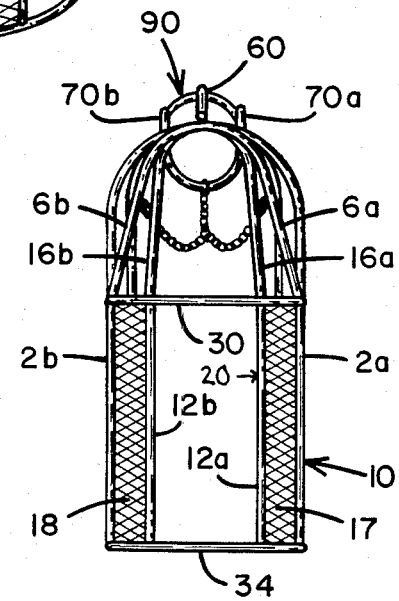
FIG. 2 is a rear elevation view of the invention.

FIG. 1 and FIG. 2 show the rear frame 10 and its preferred bend pattern, in an inverted U-shape. The rear frame 10 is approximately 22 inches high. Frame 10 has lower end sections 2a and 1b which extend vertically and parallel to each other, to join curved sections 6a and 6b respectively. Curved sections 6a and 6b extend towards the top of frame 10 where they follow a semicircular path and are joined together at the top of frame 10.

Front frame 20 is an inverted U-shape that is narrower than rear frame 10, so that the calf cannot jump forward and out of the calf restrainer when it is being lowered over the calf. Front frame 20 has lower end sections 12a and 12b which extend vertically and parallel to one another, and are joined to curved sections 16a and 16b respectively. Curved sections 16a and 16b are joined together at the top of frame 20.

Figure 3:
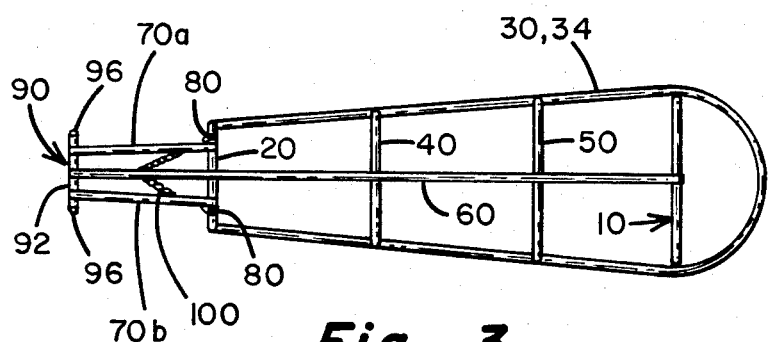
FIG. 3 is a top view of the invention.

FIGS. 1 and 3 show two horizontal U-shaped rods 30, 34 which are connected to front frame 20 and rear frame 10. Lower rod 34 is welded to lower sections 2a, 2b of rear frame 10 and lower sections 12a, 12b of front frame 20. The top rod 30 is welded to curved sections 6a, 6b of rear frame 10 and sections 16a, 16b of front frame 20.

A front top loop 40 is formed from a U-shaped rod and is welded to horizontal U-shaped rod 30. A rear top loop 50 is formed from a U-shaped rod and is also welded to horizontal U-shaped rod 30. A top support rod 60 is welded to front and rear frames 20 and 10, and also to loops 40 and 50. Support rod 60 is approximately 30 inches long and has an upward bend extending forwardly from its front end connection to frame 20.

A pair of head side rods 70a, 70b are welded to front frame 20, and project forwardly toward the front end of support rod 60.

A pair of chain snubbers 80 are welded to the front frame 20 so that the snubbers 80 extend upwardly to receive and hold the chain 100 as chain 100 is snugged up underneath the calf's jaw. In operation, the two sections of chain 100 are pulled tightly into chain snubbers 80 and hooked in a chain link to each snubber. The downward pressure of the calf's jaw keeps tension on chain 100 and prevents chain 100 from becoming unhooked from chain snubbers 80, thereby restraining the calf's head. It is understood that any means for holding the chain to the front frame 20 may be utilized.

Figure 4:
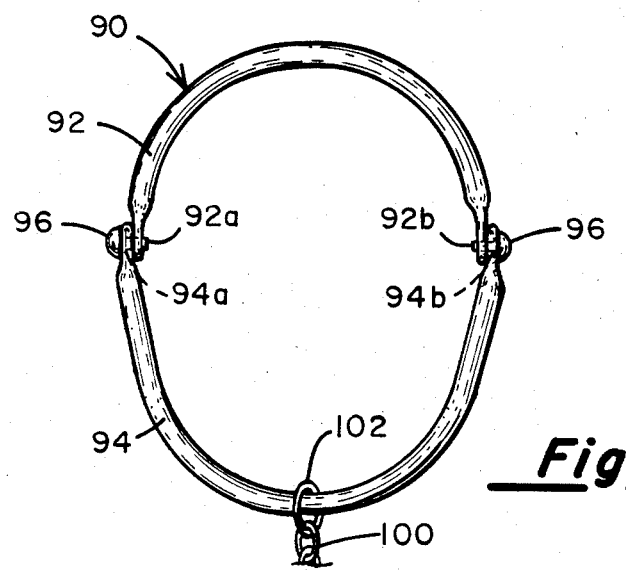
FIG. 4 is an elevation view of the hinged nose harness.

FIG. 4 shows the hinged nose harness 90 for receiving the calf's nose and mouth portion of its head to constrain head movement and prevent bawling. The upper nose piece 92 is semi-circular in shape with the inner surface facing downwards. The ends have bored holes 92a and 92b for receiving rivets 96. The lower jaw piece 94 is semi-circular in shape with the inner surface facing upwards. The ends have bored holes 94a and 94b for receipt of rivets 96.

The nose piece 92 is secured to the calf restrainer by welds to the support rod 60 and head side rods 70a, 70b so that the bottom of a plane formed by the nose piece is rotated 7° forward from a vertical plane. The rivets of the jaw piece 94 allow for the jaw piece to swing upward and outward to facilitate the reception and removal of the calf's nose and mouth. After insertion of the head, the jaw piece is swung down, and the chain 100 which is attached to it by ring 102 is secured to the frame by chain snubbers 80 as seen in FIG. 1. Thus the calf's head is held upwardly against the rigid nose piece and locked by the jaw piece.

Each side of the apparatus is preferably protected by a wire mesh 17, 18. Wire mesh 17, 18 is sufficiently fine to prevent the animal from stepping through the frame members, but sufficiently open to permit visual inspection of the animal inside of the frame assembly. It is understood that other forms of closing the sides may be used.

In operation, the apparatus is preferably grasped and transported by the top support 60. Because of its light weight, it may be easily lifted over a small animal and placed down over the animal's body to restrain the animal while it is still standing on its feet. Once it is placed over an animal, the animal's nose is placed into the front nose harness, and the nose harness is hinged to capture the animal's head in a more or less upward position. Thus restrained, the animal will remain more or less immobilized while the required treatment and/or observation is performed. After completing work on the animal, the nose harness is unhinged to release the animal's head and the apparatus is merely lifted up and over the animal to free the animal.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. A portable apparatus for catching and restraining a small animal comprising:
   (a) a first set of at least two U-shaped rods of similar shape and parallel to each other with open ends extending downward;
   (b) a second set of at least two U-shaped rods of similar shape and parallel to each other, perpendicular to said first set of U-shaped rods with open ends extending in a first direction, said second set being fastened to said first set; whereas said ends of second set being fastened to one of said outermost rods of said first set;
   (c) a support rod attached to the closed ends of said first set of U-shaped rods and extending beyond said first set in said first direction; and
   (d) head restraining means for capturing the head of said animal, attached to said support rod at said extension in said first direction beyond said open ends of said second set.

2. An apparatus, as claimed in claim 1, further comprising at least one inverted U-shaped support rod fastened to the topmost U-shaped rod of the second set in a position between said U-shaped rods of said first set.

3. An apparatus, as claimed in claim 2, wherein said top support rod further comprises an upward bend proximate its connection to said first set to cause the extended portion of said support rod to be directed upwardly.

4. An apparatus, as claimed in claim 3, further comprising means for holding a chain fastened to one of said U-shaped rods of said first set, and a chain having an end coupled to said head restraining means.

5. The apparatus of claim 1, wherein said head restraining means further comprises: upper and lower semi-circular pieces hinged together at their respective ends; said upper semi-circular piece fastened to said support rod in a plane 7° elevated from a plane formed by one of the U-shaped rods of said first set; said lower semi-circular piece pivotally attached to said upper semi-circular piece, thereby allowing an upward and forward motion of said lower semi-circular piece; and at least one chain attached to said lower semi-circular piece and to one of said U-shaped rods of said first set for restricting the motion of said lower semi-circular piece.

6. An apparatus, as claimed in claim 5, further comprising two planar mesh members attached, one to each side of the apparatus, to the U-shaped rods of said first and second sets, thereby effecting a closure on each side.

* * * * *